(12) United States Patent
Sato

(10) Patent No.: US 7,880,994 B2
(45) Date of Patent: Feb. 1, 2011

(54) VIBRATION DETECTION FOR DATA STORAGE DEVICE AND WRITE PROCESSING METHOD FOR DATA STORAGE DEVICE

(75) Inventor: Noriyuki Sato, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 160 days.

(21) Appl. No.: 12/259,873

(22) Filed: Oct. 28, 2008

(65) Prior Publication Data
US 2009/0244754 A1 Oct. 1, 2009

(30) Foreign Application Priority Data
Mar. 27, 2008 (JP) ................. 2008-82534

(51) Int. Cl.
*G11B 5/09* (2006.01)
*G11B 27/36* (2006.01)
(52) U.S. Cl. .......................... 360/53; 360/31
(58) Field of Classification Search ................ None
See application file for complete search history.

(56) References Cited

U.S. PATENT DOCUMENTS

| 7,085,087 | B2 * | 8/2006 | Fukuhisa et al. | 360/55 |
| 7,194,191 | B2 * | 3/2007 | Tada | 386/83 |
| 7,215,497 | B2 * | 5/2007 | Urata | 360/53 |
| 2003/0214743 | A1 | 11/2003 | Urata | |
| 2006/0212777 | A1 * | 9/2006 | Hirao | 714/763 |
| 2008/0239901 | A1 * | 10/2008 | Tsunokawa et al. | 369/53.15 |

FOREIGN PATENT DOCUMENTS

| JP | A 2006-252733 | 9/2006 |
| JP | B2 3942483 | 7/2007 |

* cited by examiner

*Primary Examiner*—Daniell L Negrón
*Assistant Examiner*—Regina N Holder
(74) *Attorney, Agent, or Firm*—Greer, Burns & Crain, Ltd.

(57) ABSTRACT

In a data storage device, a head writes data so as to protect data from off track writing to adjust tracks. A control unit acquires large ring buffer during sequential writing and performs a retry to return adjacent tracks, according to data of a return sector area of the ring buffer when a write error occurs. A write error due to a detection mistake of an off track error can be prevented.

14 Claims, 11 Drawing Sheets

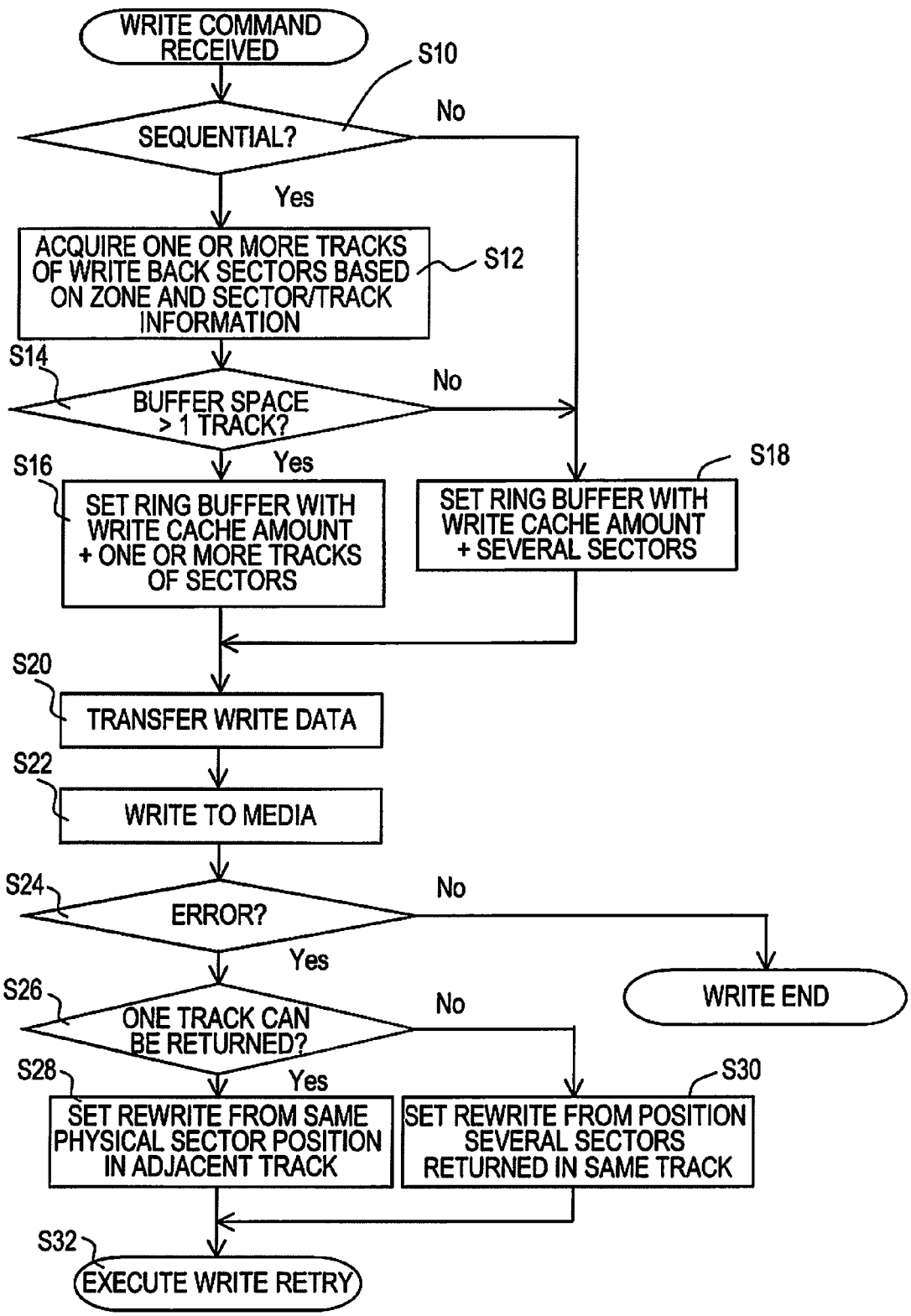

VIBRATION DETECTION FOR DATA STORAGE DEVICE AND WRITE PROCESSING METHOD FOR DATA STORAGE DEVICE

CROSS-REFERENCE TO RELATED APPLICATIONS

This application is based upon and claims the benefit of priority of the prior Japanese Patent Application No. 2008-82534, filed on Mar. 27, 2008, the entire contents of which are incorporated herein by reference.

FIELD

The present invention relates to a data storage device for recording write data from a host in a medium after storing the write data in a cache memory, and a write processing method for the data storage device, and more particularly to a data storage device which protects write data on adjacent tracks even if off track recording occurs when recording the write data to a medium, and a write processing method for the data storage device.

BACKGROUND

Because of the recent demand for computerized data processing, an increase in capacity is required for media storage devices, such as magnetic disk devices and optical disk devices, which store data. Hence advances in track density and recording density of disk media are progressing.

Such a data storage device has a cache memory, in addition to the disk medium, so that when a write command is received from a host, the write data from the host is stored in the cache memory, and in this stage, write completion is reported to the host. Then later the write data in the cache memory is written to a disk medium.

In this way, by reporting write completion to the host before recording the data to the disk medium, which takes time, the processing time of the write command can be decreased, and processing speed of the entire system can be improved.

On the other hand, when write data of a plurality of write commands from a host is stored in a cache memory, it is effective to secure a ring buffer area in the cache memory, store the write data in the cache memory sequentially, and write the data sequentially to the medium.

FIG. 11 is a diagram depicting an operation of a conventional ring buffer. In FIG. 11, the ring buffer 100 has a size corresponding to n sectors. When a write command is received, data is written from a position of a host address pointer (hereafter called HAP), and new write data overwrote the old write data received in the past.

Data is written to the medium from a position of a disk address pointer (hereafter called DAP). In FIG. 11, cached write data (data which has not yet been written to the medium) is "3" to "n", and "1" and "2" are data already written to the medium, which are controlled not to be overwritten in the buffer, so that when an error occurs, this data is save data for writing by returning from the sector where the error occurred (as data for return sectors).

For example, if write data has four sectors, n+1, n+2, n+3 and n+4, when a next write command is received from a host, the areas "1" to "4" of the ring buffer 100 are overwritten by the new write data n+1, n+2, n+3 and n+4. Writing data to the medium is progressing at this time, and write data in the areas "3" to "6" in the ring buffer 100 has already been written to the medium, so areas "5" and "6" are saved as return sectors which are not overwritten.

Conventionally, as FIG. 12 shows, the write cache data of the ring buffer 100 is write data not yet written to the medium, and return sectors are already written data, which are used when a write start LBA is returned during retry, and several sectors (2 to 4 sectors) are set for the return sectors.

When the data is being written to a disk, a write error, due to off tracking of the head, may occur some reason. In this case, when a write error is detected, sectors in the servo frame, including the sectors which is detected the error, may be damaged, so a plurality of sectors have been secured as a return area in the ring buffer 100, as shown in FIG. 12.

As FIG. 13 and FIG. 14 show, if a write error is detected in a track B, the head is moved to a position where an LBA (Logical Block Address) is returned for a predetermined number of return sectors (triangle in FIG. 14) within a range from the write error generated LBA (x in FIG. 13 and FIG. 14) to the track B, and a write retry is executed for the LBA, which is returned for a plurality of sectors from the error generated sector E (e.g. U.S. Pat. No. 3,942,483 and Japanese Patent Application Laid-Open No. 2006-252733).

In this way, conventionally if sequential write commands are continuously issued, a predetermined number of sectors of the ring buffer 100 is secured, and medium is written while overwriting old data in the ring buffer 100. When the above mentioned write error occurs, rewrite processing is performed from the LBA returned from an error detected timing for a plurality of servo frames.

Since off track writing normally occurs due to vibration from the outside, a shock sensor is installed in the storage device, and when vibration is detected by the shock sensor, influence on the adjacent tracks is prevented, such as preventing the generation of a write gate.

Because of the recent demand for downsizing devices, such a disk storage device is also installed in a compact server and mobile equipment (e.g. notebook personal computer and portable AV (Audio/Visual) equipment). Also as recording density increases, track pitch is becoming smaller. And this increases off tracking of the head.

If timing to stop the write gate generation delays when a shock is detected, writing may be executed on adjacent tracks. For example, when the detection of vibration delays due to internal vibration that the actuator (suspension) which supports the head is vibrated by the change of wind pressure generated by disk rotation or the detection sensitivity of the shock sensor during writing, timing to stop the generation of a write gate may delay.

In the case of a prior art, data does not remain in the buffer, except for a plurality of sectors for return, due to the limitation of buffer capacity, so one or more tracks of data cannot be written back, and a write error to adjacent tracks may be generated.

SUMMARY

With the foregoing in view, it is an object of the present invention to provide a data storage device for rewriting data of adjacent tracks even if data may have been written in adjacent tracks because of off tracking, and a write processing method for the data storage device.

It is another object of the present invention to provide a data storage device for rewriting data of adjacent tracks without adding any special hardware, even if data may have been written to adjacent tracks because of off tracking, and a write processing method for the data storage device.

To achieve the above-described objects, a data storage device according to the present invention includes: a head which reads and writes data from/to a rotating storage medium; an actuator which positions the head on a desired track of the storage medium; a buffer memory which stores at least write data from a host; and a control circuit which receives a write command and write data from a host, writes the write data in a predetermined ring buffer of the buffer, reports write completion to the host, and writes the write data in the ring buffer to the storage medium in use of the head. And the control circuit judges whether the received write command is in a sequential relationship specifying a write area, which is continuous from the write area of the write data specified by the write command issued immediately before, expands a return area in the ring buffer so as to secure one or more track area when determination is made that the received write command is in the sequential relationship and executes retry write of the write data for one or more tracks before the write error generated location, in use of the ring buffer, when detecting a write error which has occurred during writing the write data to the storage medium.

Further, a write processing method according to the present invention for a data storage device which positions a head for reading and writing data from/to a desired track of a rotating storage medium and reads and writes the data, the method includes the steps of: receiving a write command and write data from a host; writing the write data to a predetermined ring buffer of a buffer memory, and reporting write completion to the host; and writing the write data in the ring buffer to the storage medium in use of the head. And the receiving step further includes the steps of: judging whether the received write command is in a sequential relationship specifying a write area, which is continuous from the write area of the write data specified by the write command issued immediately before; expanding a return area of the ring buffer so as to secure one or more tracks of area when determination is made that the received write command is in the sequential relationship; and executing retry write of the write data for one or more tracks before the write error generation location, in use of the ring buffer, when detecting a write error which has occurred during writing the write data to the storage medium.

Further, according to the present invention, it is preferable that the control circuit judges whether a time, during which possibility for the device to execute write processing is high, has arrived, and expands the return area of the ring buffer so as to secure one or more tracks of area when determination is made that the received command is in the sequential relationship in the time during which the possibility is high.

Furthermore, according to the present invention, it is preferable that the control circuit expands the return area of the ring buffer so as to secure one or more tracks of area within a predetermined time from time of shipment of the device.

Additionally, according to the present invention, it is preferable that the control circuit expands the return area of the ring buffer so as to secure one or more tracks of area within a predetermined time from power ON of the device.

Further, according to the present invention, it is preferable that the data storage device including a shock sensor for detecting vibration of the device, and the control circuit judges whether vibration has been detected in past based on a vibration detection history of the shock sensor, and expands the return area of the ring buffer so as to secure one or more tracks of area when vibration has been detected in past.

Furthermore, according to the present invention, it is preferable that, when determination is made that the received command is in the sequential relationship, the control circuit judges whether the vibration has been detected within a time spanning from the time of judgment to the predetermined time in the past, and expands the return area of the ring buffer so as to secure one or more tracks of area when vibration has been detected.

In addition, according to the present invention, it is preferable that, when determination is made that the vibration has been detected within the predetermined time in past, the control circuit acquires a maximum head position deviation in the off track writing in the past, expands the return area of the ring buffer for the number of tracks corresponding to the maximum position deviation, and executes retry write from a position returned for the number of tracks.

Further, according to the present invention, it is preferable that the control circuit judges whether the number of off track error counts has exceeded a threshold within a predetermined time in the past, and expands the return area of the ring buffer so as to secure one or more tracks of area when the number of the counts has exceeded the threshold.

Furthermore, according to the present invention, it is preferable that the control circuit judges whether sequential write commands, more than the number of predetermined sectors, exist in a command history issued within a predetermined time in the past, and expands the return area of the ring buffer so as to secure one or more tracks of area when the sequential write commands exist.

Since a large ring buffer is acquired during sequential writing, a retry is performed, including adjacent tracks when a write error occurs, a write error due to a detection mistake of an off track error can be prevented. To reinforce the protection of write data during a predetermined time after power ON when write processing is often performed, or when vibration is applied while data is written, acquiring a large ring buffer makes effective use of the buffer. Also by determining an optimum number of write back sectors based on the zone and sector/track information of the device, a buffer area can be used using space economically.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 3 is a flow chart depicting a first embodiment of the write processing of the present invention;

DESCRIPTION OF EMBODIMENTS

Embodiments of the present invention will now be described in the sequence of data storage device, first embodiment of write processing, second embodiment of write processing, third embodiment of write processing, fourth embodiment of write processing and other embodiments.

[Data Storage Device]

Figure 1:
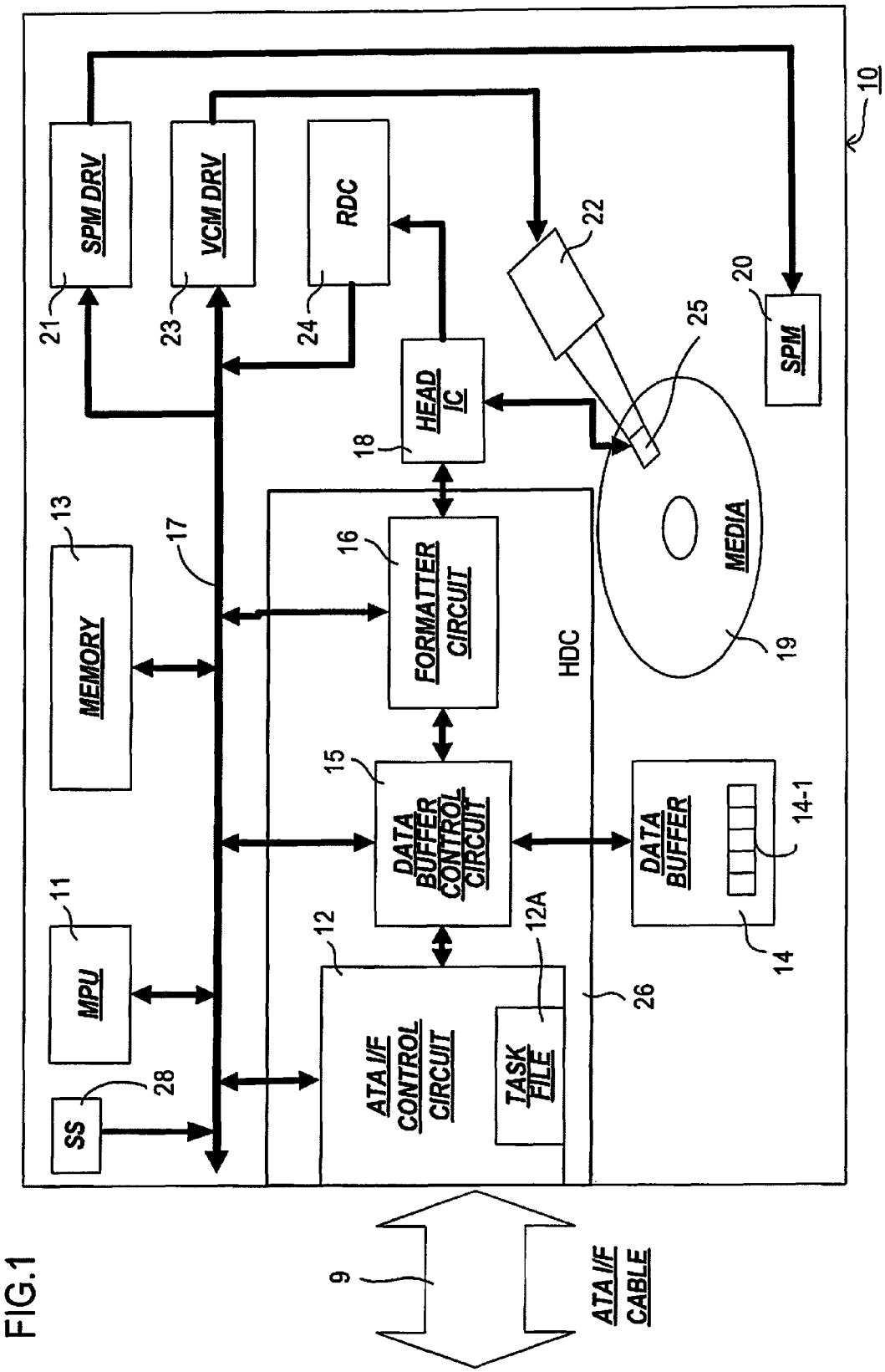
FIG. 1 is a block diagram depicting a data storage device according to an embodiment of the present invention.
Figure 2A:
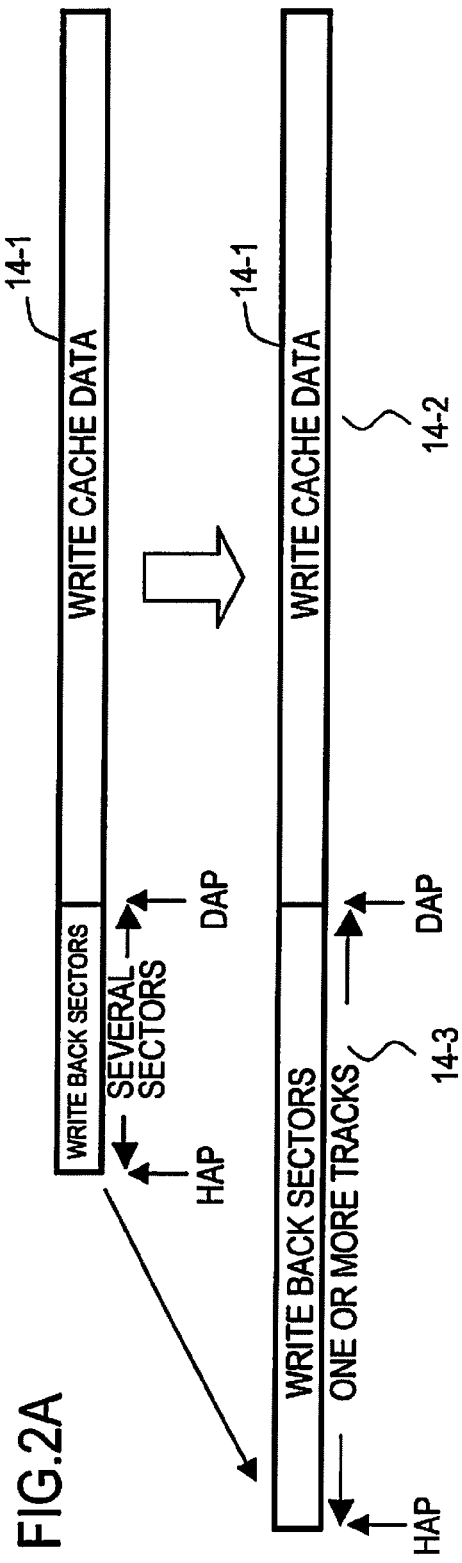
FIG. 2A and FIG. 2B are diagrams depicting the ring buffer and write retry processing according to an embodiment of the present invention.
Figure 2B:
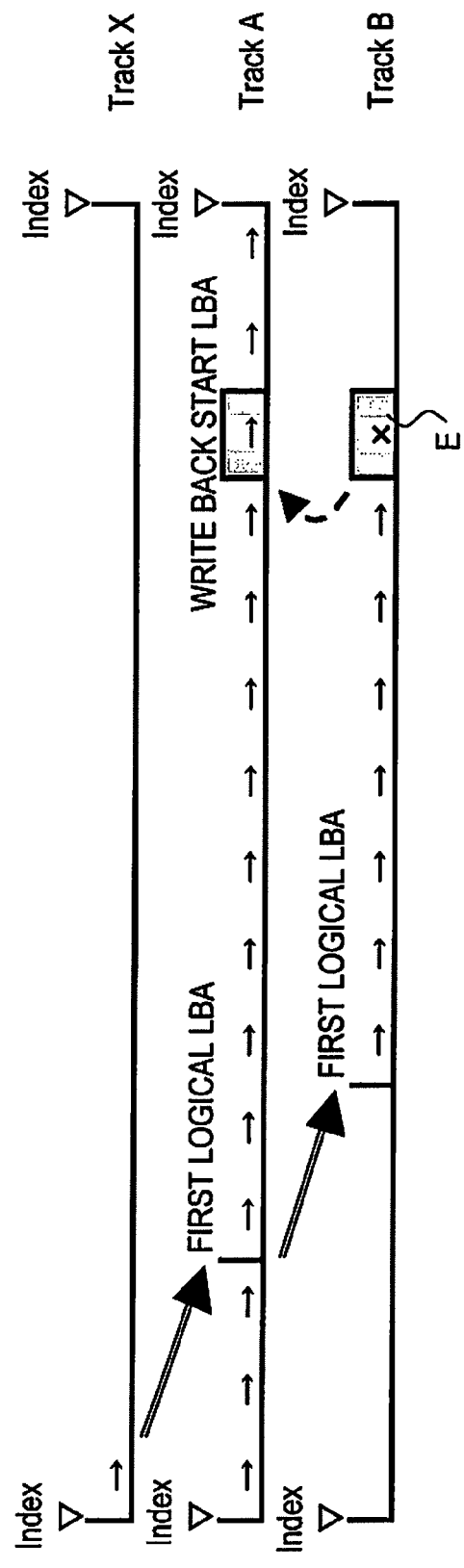

FIG. 1 is a block diagram depicting a data storage device according to an embodiment of the present invention, and FIG. 2A and FIG. 2B are diagrams depicting the ring buffer and write retry processing in FIG. 1. FIG. 1 shows a magnetic disk device (HDD), which reads/writes data from/to a magnetic disk as an example of a data storage device.

As FIG. 1 shows, a magnetic disk device 10 is built into a personal computer, and is connected to a host (not illustrated) of the personal computer with a cable 9 of an interface, such as the ATA (AT Attachment) standard.

The magnetic disk device 10 has a magnetic disk 19, a spindle motor 20 which rotates the magnetic disk 19, a magnetic head 25 which reads/writes data from/to the magnetic disk 19, and an actuator (VCM) 22 which moves the magnetic head 25 in a radius direction (track crossing direction) of the magnetic disk 19.

As a control unit, the magnetic disk device 10 has an HDC (Hard Disk Controller) 26, a data buffer 14, an MPU 11, a memory (RAM) 13, a read channel circuit (RDC) 24, a head IC 18, a spindle motor driver 21, a VCM driver 23, a shock sensor (vibration sensor) 28, and a bus 17 connecting these composing elements.

The HDC 26 has an interface control circuit 12 which has a task file 12A to set a task from the host, a data buffer control circuit 15 which controls the data buffer 14, and a format conversion circuit 16 which performs format conversion of record data, and performs inverse format conversion of read data. The read channel circuit 24 demodulates read data, and generates a read gate, write gate, read clock and write clock.

The data buffer 14 plays a role of a cache memory, and stores the write data from the host to the ring buffer 14-1, and stores the read data from the magnetic disk 19. For a write back, the write data of the data buffer 14 is written to the magnetic disk, and for reading, the read data of the data buffer 14 is transferred to the host.

For writing, the head IC 18 supplies recording current to the magnetic head 25 according to write data, and for reading, the head IC 18 amplifies the read signal from the magnetic head 25, and outputs it to the read channel circuit 24. The spindle driver 21 drives the rotation of the spindle motor 20. The VCM driver 23 drives the VCM 22 for moving the magnetic head 25.

The MPU (Micro-Processor Unit) 11 performs position detection and position control of the magnetic head 25, read/write control, and retry control. The memory (ROM/RAM) 13 stores data required for processing the MPU 11. The shock sensor 28 detects vibration, and outputs the detection signal to the MPU 11 via the bus 17.

The MPU 11 detects a position of the magnetic head 25 based on the servo signal of the magnetic disk 19 from the head IC 18, and performs seek and on track control for the VCM 22, and detects off tracking based on the detected position. If off tracking is detected during writing, the MPU 11 judges it as a write error, and stops the write gate generation for this sector.

FIG. 2A and FIG. 2B are diagrams depicting a retry control to guarantee data on adjacent tracks according to an embodiment of the present invention. When a write request is received from a host, an LBA (Logical Block Address) and SC (Sector Count) of the command are fetched from the task file, and it is judged whether this command is in a sequential relationship with the previous command. Using the received command, a number of sectors required for write return of one track is acquired based on the zone of the device and sector/track information.

As FIG. 2A shows, if this command is in a sequential relationship with the previous command and the buffer has a space, larger than the write back sectors, that continues from the last buffer of the previous command, the area of the ring buffer 14-1 is set to the area used for the write cache (sum of the number of sectors of write data which has not yet been written in the medium and the number of sectors required this time) 14-2, and an area 14-3 having a number of sectors to be held for one or more tracks of a write return. Furthermore, the number of write return sectors may be secured for the corresponding number of tracks.

As FIG. 2B shows, if a write error is detected when the sequential write data in the ring buffer 14-1 is being written to the medium, seek is executed to a position (Track=A/Physical Sector=X), which is a position when one track returned from the physical position where the error occurred (Track=B/Physical Sector=X), and rewrite is executed.

In this way, if off tracking is detected at the physical sector position X of track B, the data is rewritten from the physical sector position X of track A, since the data at position 1 track returned (physical sector position X of track A) has not been overwritten in the ring buffer 14-1.

Therefore even if off tracking, detected at the physical sector position X of track B, affects the data at the physical sector position X of track A, the data can be recovered by rewriting the data at the physical sector position X of track A.

First Embodiment of Write Processing

Figure 4:
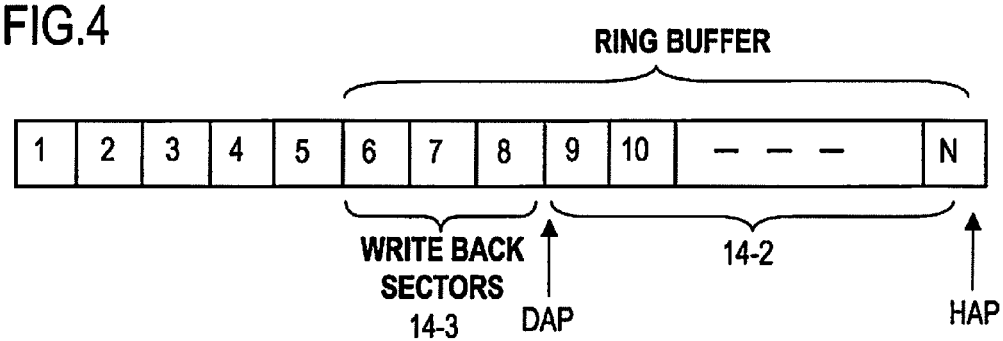
FIG. 4 is a diagram depicting a ring buffer setup processing on not sequential relationship in FIG. 3.
Figure 5:
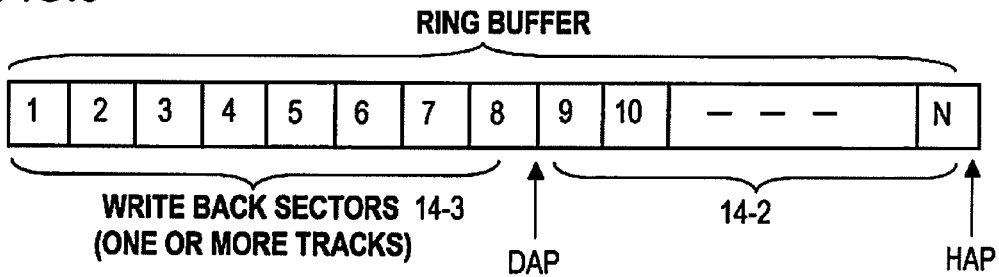
FIG. 5 is a diagram depicting a ring buffer setup processing on sequential relationship in FIG. 3.
Figure 6:
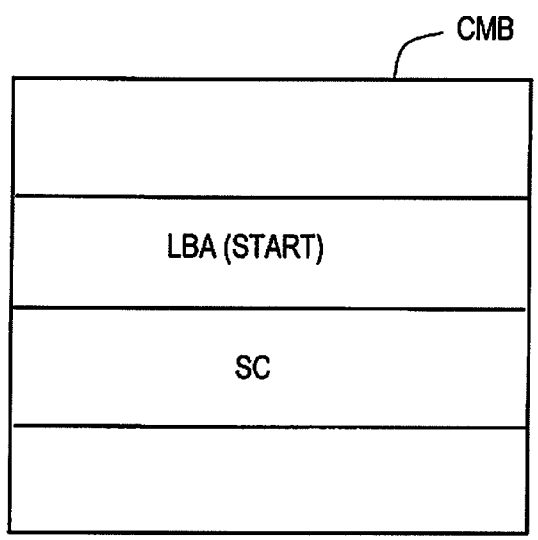
FIG. 6 is a diagram depicting a command block in FIG. 3.
Figure 7:
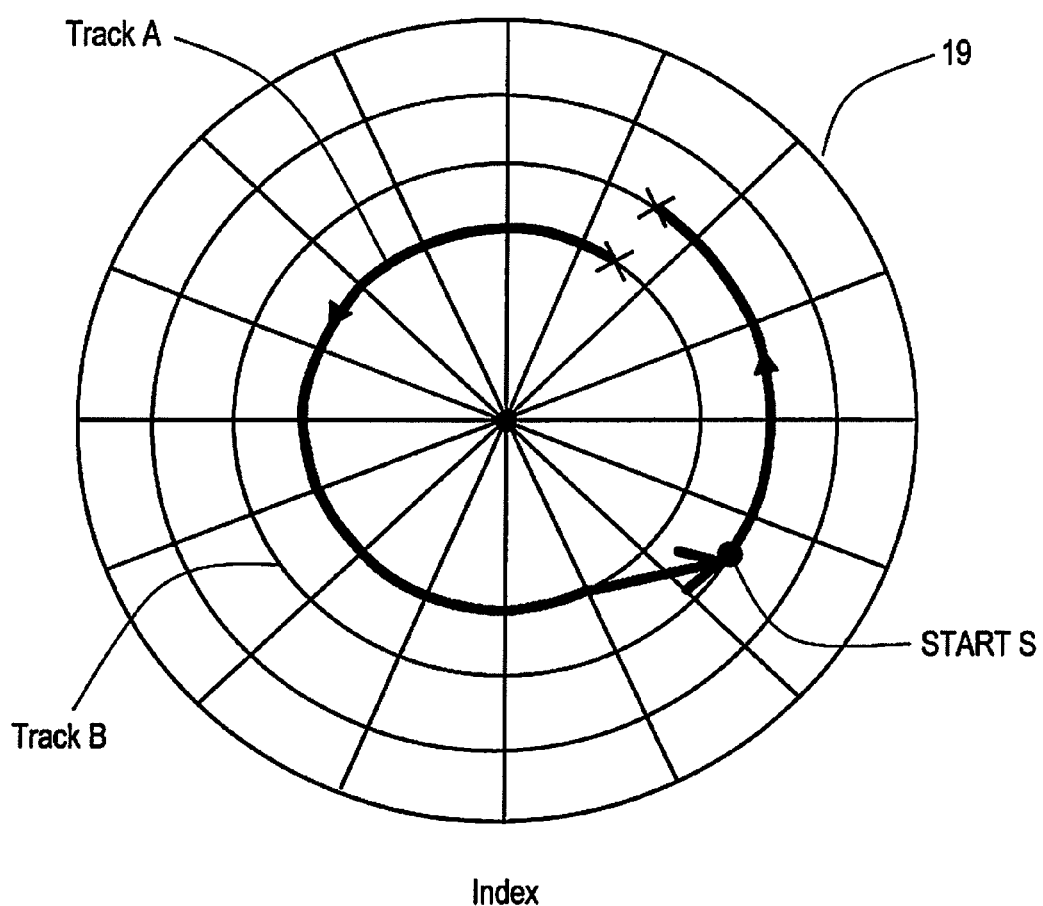
FIG. 7 is a diagram depicting retry write processing in FIG. 3.

FIG. 3 is a flow chart depicting a first embodiment of the write processing of the present invention, FIG. 4 and FIG. 5 are diagrams depicting the ring buffer setup processing in FIG. 3, FIG. 6 is a diagram depicting a command block, and FIG. 7 is a diagram depicting retry write processing.

(S10) When the MPU 11 receives a write request from the host, the MPU 11 fetches an LBA (Logical Block Address) and SC (Sector Count) from the task file 12A. As FIG. 6 shows, the command block CMB includes a start LBA and a sector count (SC) from the start LBA requested by the write command. The MPU 11 judges whether the write command received this time and the write command received last time are in a sequential relationship. For example, a final sector number (LBA) of the write data received last time is calculated since the write command received last time also includes an LBA and SC. Whether the start LBA of the write command received this time is the next LBA of this final LBA is judged to determine whether these commands are sequential. If it is determined that the start LBA of the write command received this time is the next LBA of the final LBA, it is regarded that these commands are sequential, and if not, it is regarded that these commands are not sequential.

(S12) If it is determined that these commands are sequential, the MPU 11 converts the start LBA and SC into the zone and sector/track information of the device, and acquires a number of sectors required for performing a one track write return. For example, the MPU 11 calculates a number of sectors of one track based on the zone/track of the write command received this time.

(S14) If these commands are sequential, the MPU 11 next judges whether the buffer 14 has a more continuous space than the write return sector count from the final buffer position (HAP) of the previous command. If the buffer 14 does not have a more continuous space than the write return sector count, processing advances to step S18.

(S16) If the buffer 14 has a more continuous space than the write return sector count, the MPU 11 sets an area used for a write cache (sum of the number of sectors of write data which have not yet been written to medium and the number of sectors required this time) 14-2, and an area 14-3 with the number of sectors which are held for one or more track(s) of a write return for the area setup of the ring buffer 14-1, as shown in FIG. 5. The write return sectors may be secured for a plurality of tracks.

(S18) If the commands are not sequential, or if the buffer does not have a more continuous space than the write return sector count, the MPU 11 sets an area used for a write cache (sum of the number of sectors of write data which has not yet been written to medium and the number of sectors required this time) 14-2 and several sectors of write return area 14-3 for the area setup of the ring buffer 14-1, as shown in FIG. 4.

(S20) Then the write data from the host is transferred to and stored in the write cache area 14-2. After storing the data, the MPU 11 reports write completion to the host.

(S22) The MPU 11 instructs the data buffer control circuit 15 to write the write data in the ring buffer 14-1 to the disk 19 from DAP in FIG. 4 and FIG. 5. Thereby, the magnetic head 25 writes the write data of the ring buffer 14-1 to the magnetic disk 19 from DAP in sector units.

(S24) The MPU 11 detects whether a write error (off tracking) occurred, based on the position information of the head 25 in sector units. If an error is not detected in all the write data, write operation ends.

(S26) When a write error (off tracking) is detected, the MPU 11 judges, based on the setup of the ring buffer 14-1, whether rewrite is possible from a position (Track=A/Physical Sector=X), which is one track returned from the physical position (Track=B/Physical Sector=X) of the sector where an error occurred.

(S28) If it is determined that rewrite is possible from a position one track returned, the MPU 11 executes seek to a position (Track=A/Physical Sector=X) which is one track returned from the physical position (Track=B/Physical Sector=X) of the sector where an error occurred. Then the MPU 11 sets the DAP of the ring buffer 14-1 in a position (Track=A/Physical Sector=X) which is one track returned from the physical position (Track=B/Physical Sector=X) of the sector where an error occurred.

(S30) If it is determined that rewrite from the position one track returned is impossible, on the other hand, the MPU 11 sets the DAP of the ring buffer 14-1 in a sector position (Track=A/Physical Sector=X) which is several sectors returned from the physical position (Track=B/Physical Sector=X) of the sector where an error occurred.

(S32) The MPU 11 instructs the data buffer control circuit 15 to write the write data of the ring buffer 14-1 to the disk 19 from DAP. Thereby, the magnetic head 25 rewrites the write data in the ring buffer 14-1 to the magnetic disk 19 from the DAP which is one track returned, or a position which is returned by the return sector count.

As FIG. 7 shows, if off tracking is detected in the physical sector position X of track B, data is not overwritten in a position one track returned (physical sector position X on track A) in the ring buffer 14-1, so the data can be rewritten from the physical sector position X of track A.

Second Embodiment of Write Processing

Figure 8:
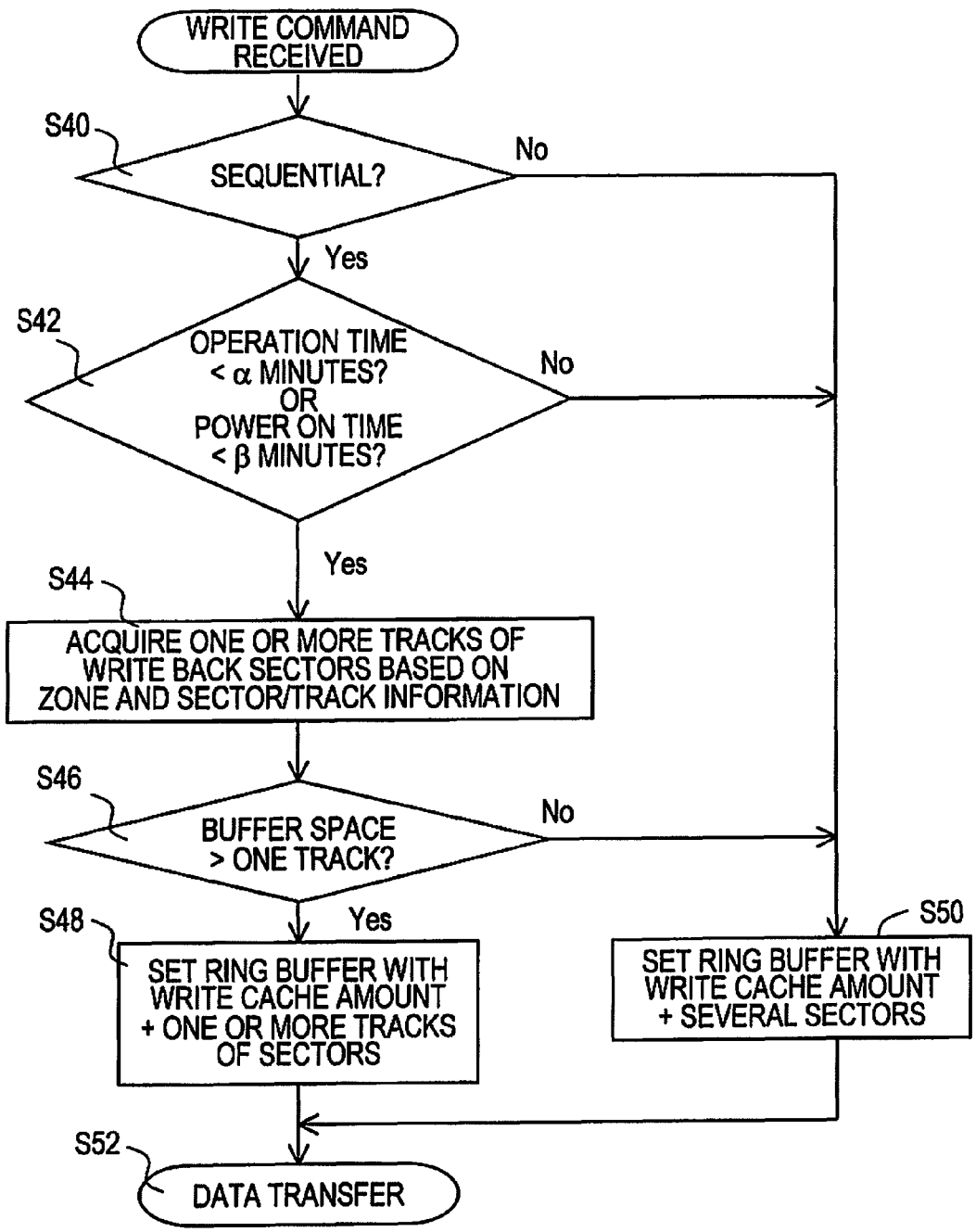
FIG. 8 is a flow chart depicting a second embodiment of the write processing of the present invention.

FIG. 8 is a flow chart depicting a second embodiment of the write processing of the present invention. In the above mentioned first embodiment, write return sector count is expanded if a sequential relationship exists. However, in terms of effective use of the buffer 14, it may be more effective in some cases to expand the write return sector count only when data protection is necessary. The present embodiment is an example of executing an expansion of the write return sector count when installing such important data as an OS or when the possibility of executing write processing is high.

(S40) Just like step S10 in FIG. 3, when a write request is received from the host, the MPU 11 judges whether the start LBA of the write command received this time is the next LBA of the final LBA to determine whether this command is sequential. If it is determined that the start LBA is the next LBA of the final LBA, it is regarded that these commands are sequential, and if not, it is regarded that these commands are not sequential.

(S42) If it is determined that these commands are sequential, the MPU 11 judges whether the operation time of the device since shipment is within a predetermined time ($\alpha$ minutes in FIG. 5), or the time elapsed from power ON is within a predetermined time ($\beta$ minutes in FIG. 5). If the MPU 11 determined that the operation time of the device since shipment is not within the predetermined time ($\alpha$ minutes in FIG. 8), or the time elapsed from power ON is not within the predetermined time ($\beta$ minutes in FIG. 8), processing advances to step S50.

(S44) If it is determined that the operation time of the device since shipment is within the predetermined time ($\alpha$ minutes in FIG. 5), or the time elapsed from power ON is within a predetermined time ($\beta$ minutes in FIG. 5), the MPU 11 acquires a number of sectors required for performing one track of write return based on the received write command, just like step S12 in FIG. 3. For example, the MPU 11 calculates a number of sectors of one track based on the zone/track of the write command received this time.

(S46) Just like step S14 in FIG. 3, the MPU 11 judges whether the buffer 14 has a more continuous space than the write return sector count from the final buffer position (HAP) of the previous command. If the buffer 14 does not have a more continuous space than the write return sector count, processing advances to step S50.

(S48) If the buffer 14 has a more continuous space than the write return sector count, then just like step S16 in FIG. 3, the MPU 11 sets an area used for a write cache (sum of the number of sectors of write data which has not yet been written to the medium and the number of sectors required this time) 14-2, and an area 14-3 with the number of sectors which are held for one or more tracks of write back for the area setup of the ring buffer 14-1. The write back sectors may be secured for a plurality of tracks.

(S50) If the commands are not sequential, or if the operation time of the device since shipment is not within a predetermined time (α minutes in FIG. 8), or if the time elapsed from power ON is not within a predetermined time (β minutes in FIG. 8), or if the buffer does not have a more continuous space than the write return sector count, the MPU 11 sets an area used for a write cache (sum of the number of sectors of write data which has not yet been written in the medium and the number of sectors required this time) 14-2 and several sectors of write back area 14-3 for the area setup of the ring buffer 14-1, just like step S18 in FIG. 3.

(S52) Then the write data from the host is transferred to and stored in the write cache area 14-2, just like the step S20 in FIG. 3. After storing the data, write completion is reported to the host.

Hereafter processing the same as steps S22 to S32 in FIG. 3 is performed.

In this way, the write return sector count is expanded only when the possibility of execution of write processing is high (e.g. when an OS or an application may be installed), so as to use the buffer 14 effectively.

Third Embodiment of Write Processing

Figure 9:
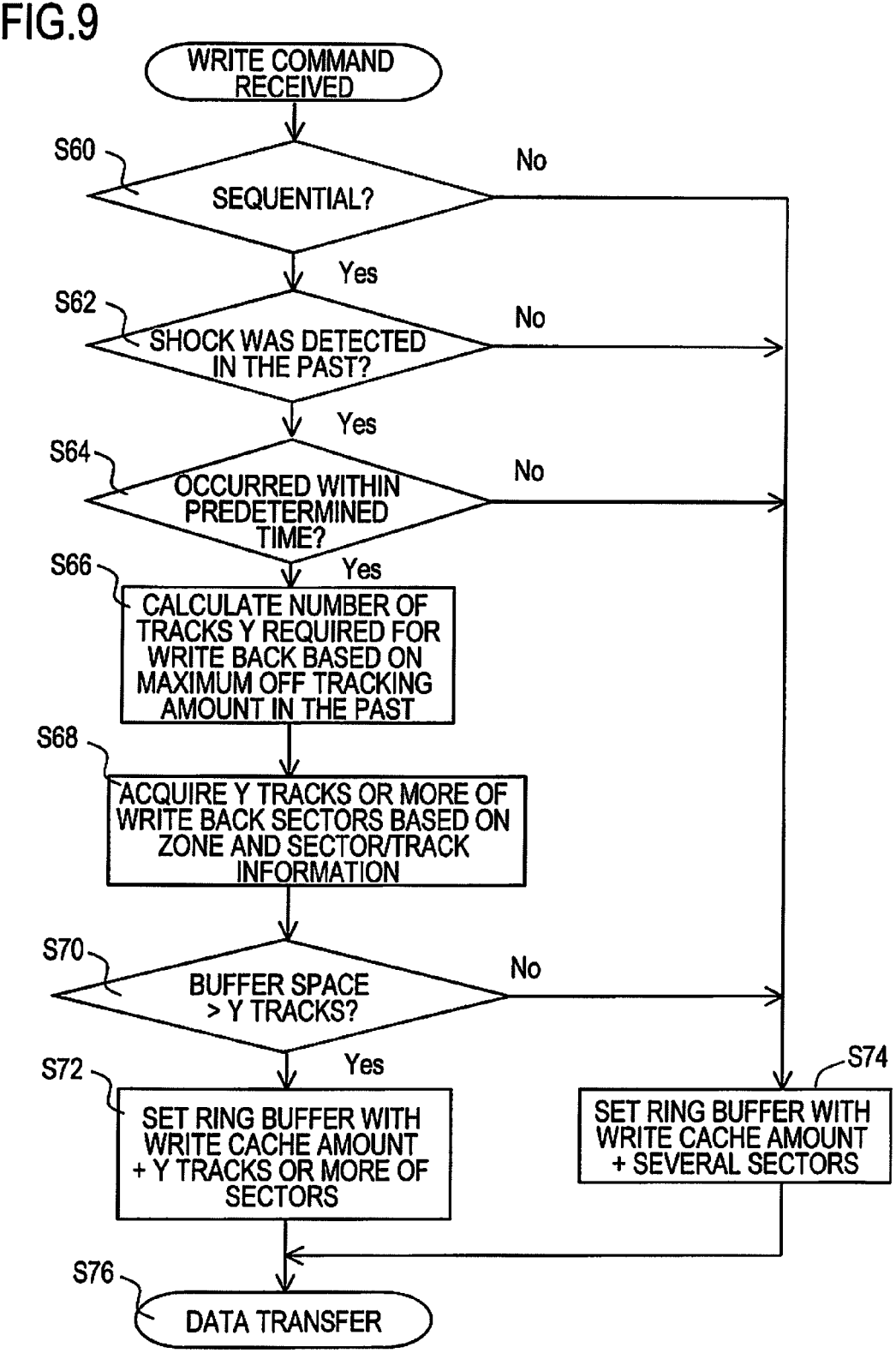
FIG. 9 is a flow chart depicting a third embodiment of the write processing of the present invention.

FIG. 9 is a flow chart depicting a third embodiment of the write processing of the present invention. This embodiment is an example of executing an expansion of the write return sector count only when a sequential relationship exists and data protection is required, just like the embodiment in FIG. 8. In this embodiment, the expansion of the write return sector count is executed when the device is in an environment subject to vibration based on past history.

(S60) Just like step S10 in FIG. 3, when a write request is received from the host, the MPU 11 judges whether the start LBA of the write command received this time is the next LBA of the final LBA to determine whether this command is sequential. If it is determined that the start LBA is the next LBA of the final LBA, it is regarded that these commands are sequential, and if not, it is regarded that these commands are not sequential, and processing advances to step S72.

(S62) If it is determined that these commands are sequential, the MPU 11 judges whether a write error due to shock has ever been detected, based on the shock detection history, in the history information of the device in the past (e.g. SMART: Self Monitoring and Analysis Report Technology). If a write error due to shock was not detected in the past, processing advances to step S74.

(S64) If it is determined that a write error due to shock has been detected in the past, the MPU 11 judges whether a write error due to shock was detected in a range of a predetermined time (e.g. one minute) before the current point of time. In other words, whether the error occurred very recently is judged. If a write error due to shock was not detected in the range of a predetermined time (e.g. one minute) before the current point of time, processing advances to step S74.

(S66) If it is determined that a write error due to shock was detected in the range of a predetermined time (e.g. one minute) before the current point of time, the MPU 11 calculates a number of tracks required for write return based on the maximum off tracking amount in the past history. In other words, when the device has a function to calculate the head position when off tracking write is detected when writing data to the medium, and store the maximum off tracking amount (Y), it is highly possible that off tracking having the maximum off tracking amount is generated again when off tracking occurs.

(S68) Just like step S12 in FIG. 3, the MPU 11 acquires a number of sectors required to execute Y tracks or more of write return using the received write command. For example, a number of sectors of Y tracks is calculated based on the zone/track of the write command received this time.

(S70) Just like step S14 in FIG. 3, the MPU 11 judges whether the buffer 14 has a more continuous space than the write return sector count from the final buffer position (HAP) of the previous command. If the buffer 14 does not have a more continuous space than the write return sector count, processing advances to step S74.

(S72) If the buffer 14 has a more continuous space than the write return sector count, then just like step S16 in FIG. 3, the MPU 11 sets an area used for a write cache (sum of the number of sectors of write data which has not yet been written in the medium and the number of sectors required this time) 14-2 and an area 14-3 with the number of sectors which are held for Y tracks or more of write back for the area setup of the ring buffer 14-1.

(S74) If the commands are not sequential, or if the buffer does not have a more continuous space than the write return sector count, the MPU 11 sets an area used for a write cache (sum of the number of sectors of write data which has not yet been written in the medium and the number of sectors required this time) 14-2 and several sectors of write back area 14-3 for the area setup of the ring buffer 14-1, just like step S18 in FIG. 3.

(S76) Then the write data from the host is transferred to and stored in the write cache area 14-2, just like step S20 in FIG. 3. After storing the data, write completion is reported to the host.

Hereafter processing the same as steps S22 to S32 in FIG. 3 is performed.

In this way, the write return sector count is expanded only when the device is in an environment subject to vibration, so as to use the buffer 14 effectively. Even if vibration exists, the write return sector count is not expanded if vibration has not occurred in the recent past. If vibration exists and has occurred very recently in the past, the write return sector count is expanded to the maximum off track count, so as to reinforce the data protection function.

Fourth Embodiment of Write Processing

Figure 10:
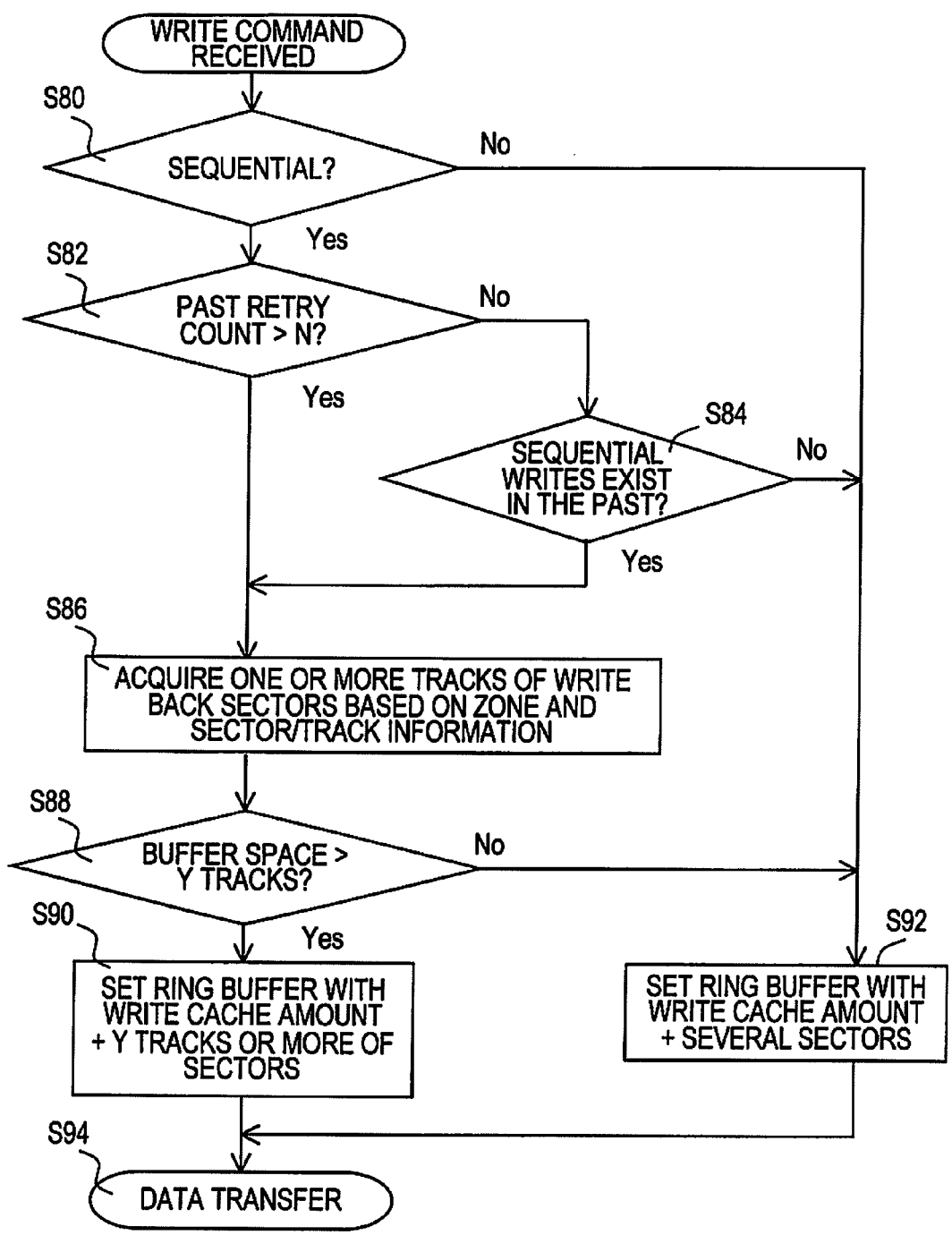
FIG. 10 is a flow chart depicting a fourth embodiment of the write processing of the present invention.
Figure 11:
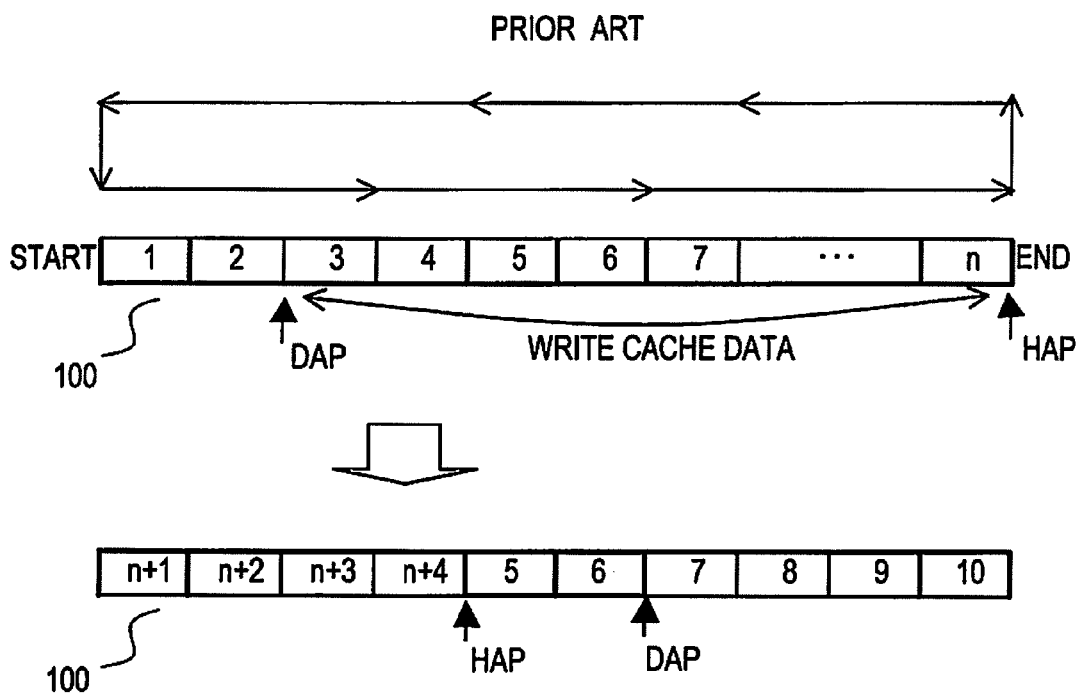
FIG. 11 is a diagram depicting an operation of a conventional ring buffer.
Figure 12:
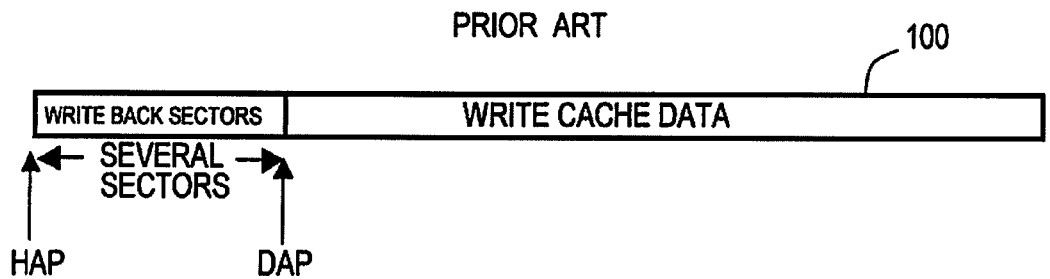
FIG. 12 is a diagram depicting settings of a conventional ring buffer.
Figure 13:
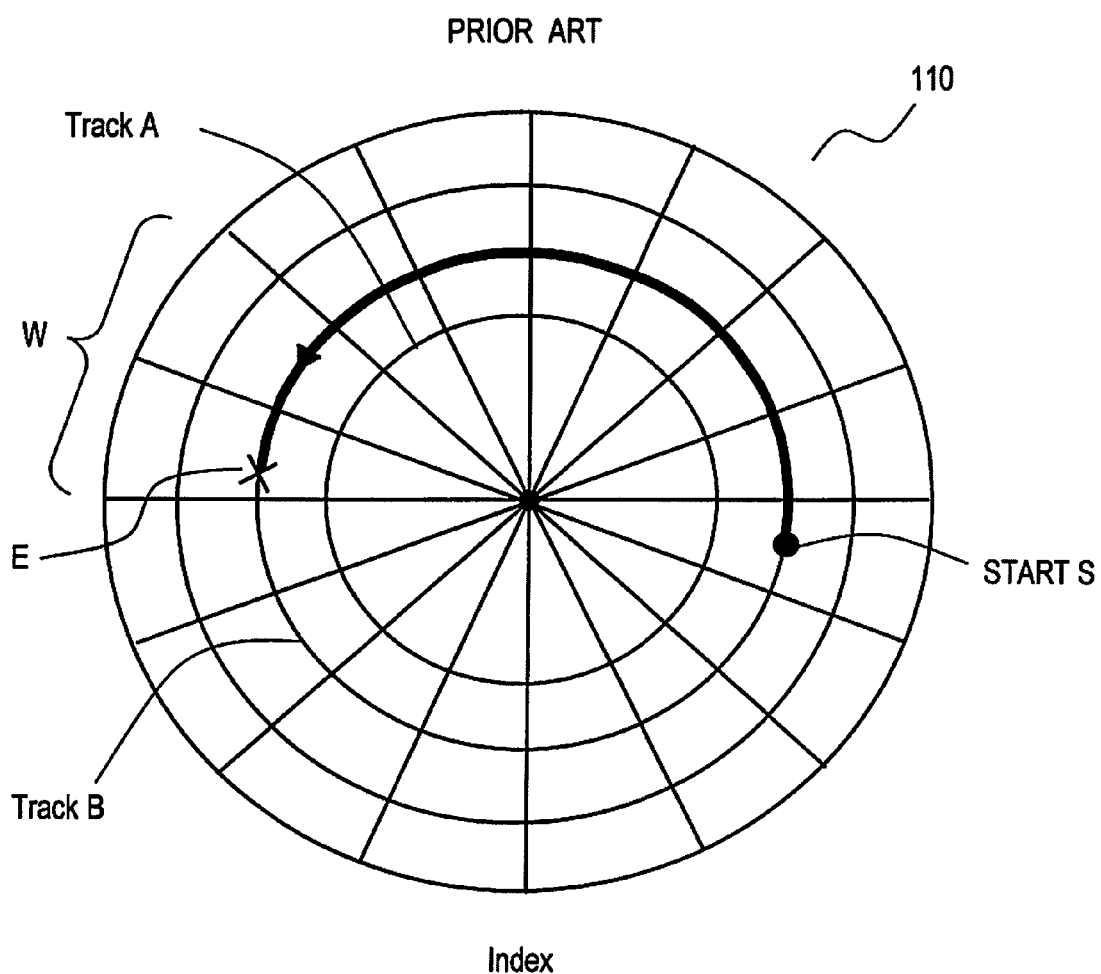
FIG. 13 is a diagram depicting an operation of a conventional write retry processing.
Figure 14:
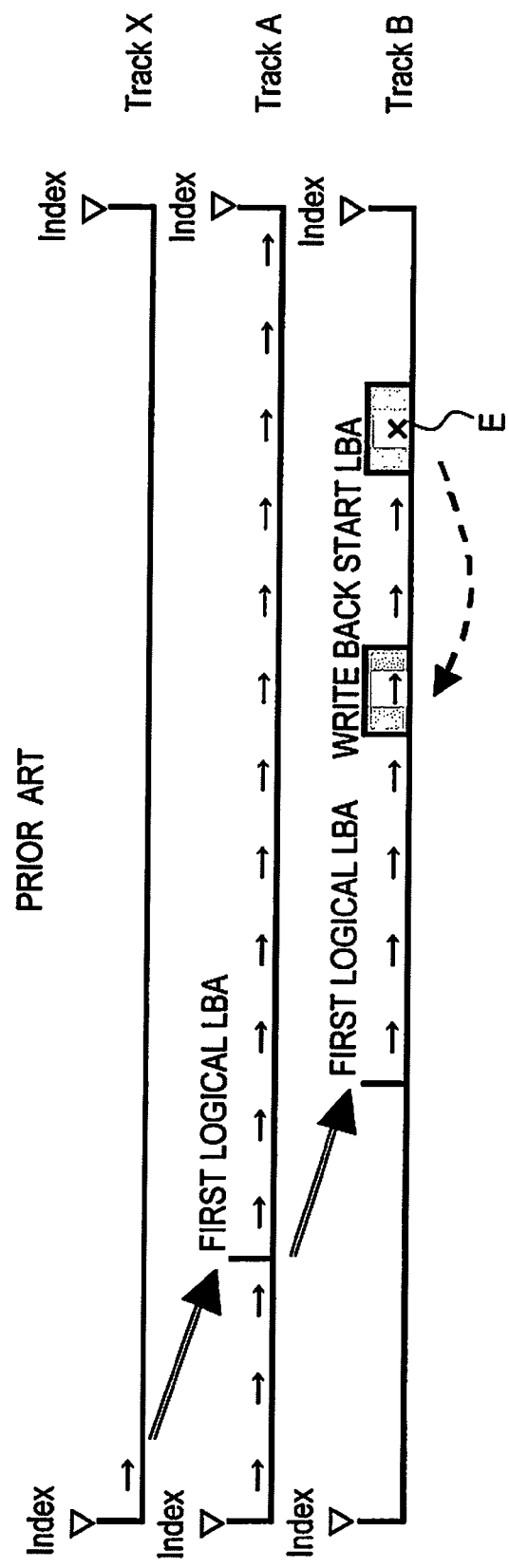
FIG. 14 is a diagram depicting settings of a conventional write retry processing.

FIG. 10 is a flow chart depicting a fourth embodiment of the write processing of the present invention. The present embodiment is an example of executing an expansion of the write return sector count only when a sequential relationship exists and data protection is required, just like the embodiment in FIG. 8. In the present embodiment, the expansion of the write return sector count is executed when the device is in a retry environment based on the past history.

(S80) Just like step S10 in FIG. 3, when a write request is received from the host, the MPU 11 judges whether the start LBA of the write command received this time is the next LBA of the final LBA, to determine whether this command is sequential. If it is determined that the start LBA is the next LBA of the final LBA, it is regarded that these commands are sequential, and if not, it is regarded that these commands are not sequential.

(S82) If it is determined that these commands are sequential, the MPU 11 judges whether the number of the write retry in the past has exceeded a predetermined number (N times in FIG. 10, e.g. 5 times) in a range of a predetermined time before the current point of time (e.g. 5 minutes). If exceeded, processing advances to step S86.

(S84) If the MPU 11 determined that the number of the write retry in the past does not exceed a range of a predetermined time before the current point of time (e.g. 5 minutes), the MPU 11 judges whether sequential write commands, more than the predetermined number of sectors, were received in the past based on the command history. If the sequential write commands, more than the predetermined number of sectors, were not received in the past, processing advances to step S92.

(S86) If sequential write commands, more than the predetermined number of sectors, were received in the past and the retry count in the past has exceeded a predetermined count, the MPU 11 acquires a number of sectors required for performing one track of write return based on the received write command, just like step S12 in FIG. 3. For example, the MPU 11 calculates a number of sectors of one track based on the zone/track of the write command received this time.

(S88) Just like step S14 in FIG. 3, the MPU 11 judges whether the buffer 14 has a more continuous space than the write return sector count from the final buffer position (HAP) of the previous command. If the buffer 14 does not have a more continuous space than the write return sector count, processing advances to step S92.

(S90) If the buffer 14 has a more continuous space than the write return sector count, then just like step S16 in FIG. 3, the MPU 11 sets an area used for a write cache (sum of the number of sectors of write data which has not yet been written in the medium and the number of sectors required this time) 14-2 and an area 14-3 with the number of sectors which are held for one or more tracks of write back for the area setup of the ring buffer 14-1. The write return sectors may be secured for a plurality of tracks.

(S92) If the commands are not sequential, or if the buffer does not have a more continuous space than the write return sector count, the MPU 11 sets an area used for a write cache (sum of the number of sectors of write data which has not yet been written in the medium and the number of sectors required this time) 14-2 and several sectors of write back area 14-3 for the area setup for the ring buffer 14-1, just like step 18 in FIG. 3.

(S94) Then the write data from the host is transferred to and stored in the write cache area 14-2, just like step S20 in FIG. 3. After storing the data, write completion is reported to the host.

Hereafter, processing the same as steps S22 to S32 in FIG. 3 is performed.

In this way, the write return sector count is expanded when the commands are sequential and the device is in a retry environment, so as to use the buffer 14 effectively.

Other Embodiments

In the embodiment in FIG. 9, an example of detecting shock in the past and expanding the write return sector count when the shock occurred during a predetermined time was described, however the write return sector count may be expanded when a shock is detected in the past. The data storage device was described using an example of a magnetic disk device, but the present invention can also be applied to other storage devices using an optical disk, magneto-optical disk or other storage medium which is recorded in sector units. Also the interface is not limited to ATA, but the present invention can also be applied to other interfaces.

The preferred embodiments described herein are therefore illustrative and not restrictive, the scope of the invention being indicated by the appended claims and all variations with come within the meaning of the claims are intended to be embraced therein.

Since a large ring buffer is acquired during sequential writing, a retry is performed, including adjacent tracks when a write error occurs, a write error due to a detection mistake of an off track error can be prevented. To reinforce the protection of write data during a predetermined time after power ON when write processing is often performed, or when vibration is applied while data is written, acquiring a large ring buffer makes effective use of the buffer. Also by determining an optimum number of write back sectors based on the zone and sector/track information of the device, a buffer area can be used using space economically.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A data storage device, comprising:
a shock sensor for detecting vibration of the device;
a head which reads and writes data from/to a rotating storage medium;
an actuator which positions the head on a desired track of the storage medium;
a buffer memory which stores at least write data from a host; and
a control circuit which receives a write command and write data from the host, writes the write data in a ring buffer of the buffer memory, reports write completion to the host, and writes the write data in the ring buffer to the storage medium in use of the head, wherein
the control circuit (a) judges whether the received write command is in a sequential relationship with a write command issued immediately before, the received write command specifying a write area that is continuous from a write area specified by the write command issued immediately before in the sequential relationship, (b) judges whether vibration has been detected in a past based on a vibration detection history of the shock sensor, (c) judges whether the vibration has been detected within a time period between a time of the judgment and a predetermined time in the past when it is judges that the received write command is in the sequential relationship, (d) expands a write return area in the ring buffer which secures one or more track area when the vibration has been detected within the time period in the past (e) detects a write error which has occurred during writing the write data to the storage medium, and (f) executes retry write of the write data for one or more tracks before the write error generated location, in use of the ring buffer.

2. The data storage device according to claim 1, wherein the control circuit judges whether there is a high possibility for the device to execute write processing in the time period in the past and expands the write return area when it is judged that there is the high possibility for the device to execute the write processing while the vibration has been detected within the time period in the past.

3. The data storage device according to claim 2, wherein the control circuit expands the write return area when it is judged that there is the high possibility for the device to execute the write processing while the vibration has been detected within the time period in the past and within a predetermined time period from time of shipment of the device.

4. The data storage device according to claim 2, wherein the control circuit expands the write return area when it is judged that there is the high possibility for the device to execute the write processing while the vibration has been detected within the time period in the past and within a predetermined time period from power ON of the device.

5. The data storage device according to claim 1, wherein when determination is made that the vibration has been detected within the predetermined time period, the control circuit acquires a maximum head position deviation in the off track writing in the past, expands the write return area of the ring buffer for the number of tracks corresponding to the maximum position deviation, and executes retry write from a position returned for the number of tracks.

6. The data storage device according to claim 1, wherein the control circuit judges whether the number of off track error has exceeded a threshold within the time period in the past, and expands the write return area when the number of the off track error has exceeded the threshold while the vibration has been detected within the time period in the past.

7. The data storage device according to claim 1, wherein the control circuit judges whether sequential write commands, more than the number of predetermined sectors, exist in a command history issued within the time period in the past, and expands the write return area when the sequential write commands exist while the vibration has been detected within the time in the past.

8. A write processing method for a data storage device which positions a head for reading and writing data from/to a desired track of a rotating storage medium and reads and writes the data, the method comprising:
receiving a write command and write data from a host;
writing the write data to a ring buffer of a buffer memory, and reporting write completion to the host; and
writing the write data in the ring buffer to the storage medium in use of the head, wherein
the receiving further comprises:
judging whether the received write command is in a sequential relationship with a write command issued immediately before, the received write command specifying a write area that is continuous from a write area specified by the write command issued immediately before in the sequential relationship;
judging whether vibration has been detected in a past based on a vibration detection history of a shock sensor;
judging whether the vibration has been detected within a time period between a time of the judgment and a predetermined time in the past when it is judged that the received write command is in the sequential relationship;
expanding a write return area of the ring buffer which secure one or more tracks of area when the vibration has been detected within the time period in the past
detecting a write error which has occurred during writing the write data to the storage medium; and
executing retry write of the write data for one or more tracks before the write error generation location, in use of the ring buffer.

9. The write processing method for a data storage device according to claim 8, wherein
the receiving further comprises
judging whether there is a high possibility for the device to execute write processing in the time period in the past, and
the expanding expands the write return area when it is judged that there is the high possibility for the device to execute the write processing while the vibration has been detected within the time period in the past 10. The write processing method for a data storage device according to claim 9, wherein the receiving further comprises judging whether a predetermined time period has not yet elapsed from time of shipment of the device.

11. The write processing method for a data storage device according to claim 9, wherein the receiving further comprises judging whether a predetermined time period has not yet elapsed from power ON of the device.

12. The write processing method for a data storage device according to claim 8, further comprising:
acquiring a maximum head position deviation in a off track writing in the past when determination is made that the vibration has been detected within the time period in the past;
expanding the write return area of the ring buffer for the number of tracks corresponding to the maximum position deviation; and
executing retry write from a position returned for the number of tracks.

13. The write processing method for a data storage device according to claim 8, wherein
the receiving further comprises
judging whether the number of off track error has exceeded a threshold within the time period in the past, and
the expanding expands the write return area when the number of the off track error has exceeded the threshold while the vibration has been detected within the time period in the past.

14. The write processing method for a data storage device according to claim 8, wherein
the receiving further comprises
judging whether sequential write commands, more than the number of predetermined sectors, exist in a command history issued within the time period in the past, and
the expanding expands the write return area when the sequential write commands exist while the vibration has been detected within the time period in the past.

* * * * *